Feb. 17, 1942.    G. D. CALDWELL ET AL    2,273,512
VIEWING INSTRUMENT FOR STEREOSCOPIC PICTURES AND THE LIKE
Filed March 16, 1938    2 Sheets-Sheet 1
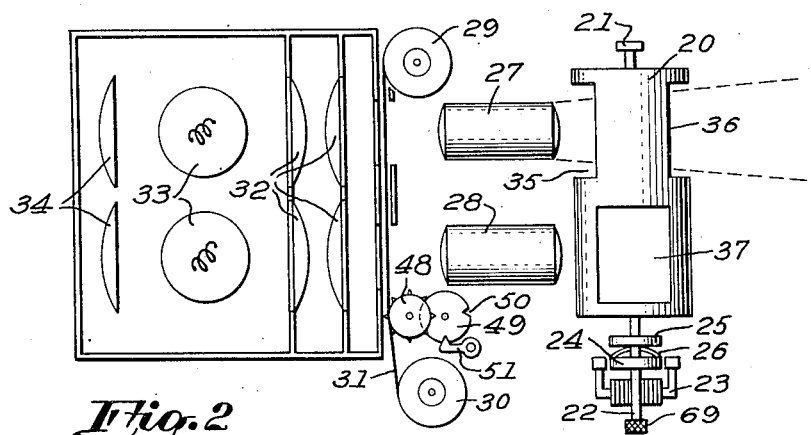
Fig. 1
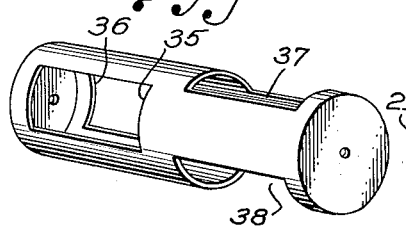
Fig. 2
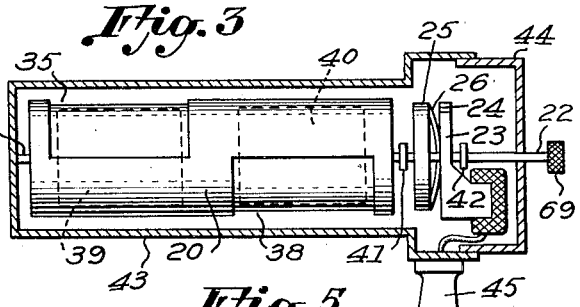
Fig. 3
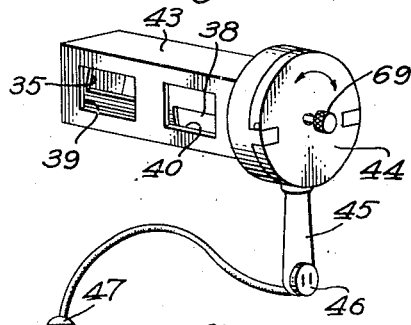
Fig. 4
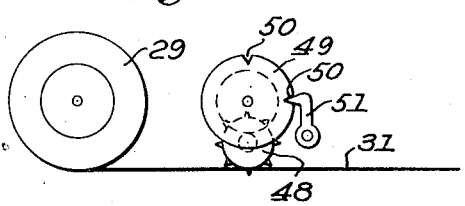
Fig. 5
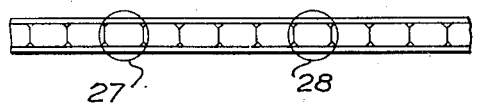
Fig. 6
Fig. 7
Inventors.
GEOFFREY D. CALDWELL
GEORGE M. HATHORN
By C. G. Stallings
Attorney.

Feb. 17, 1942.         G. D. CALDWELL ET AL         2,273,512
VIEWING INSTRUMENT FOR STEREOSCOPIC PICTURES AND THE LIKE
Filed March 16, 1938          2 Sheets-Sheet 2
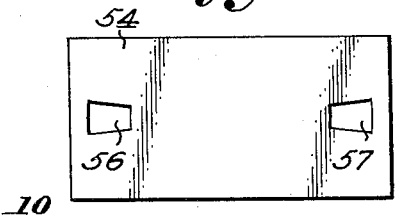
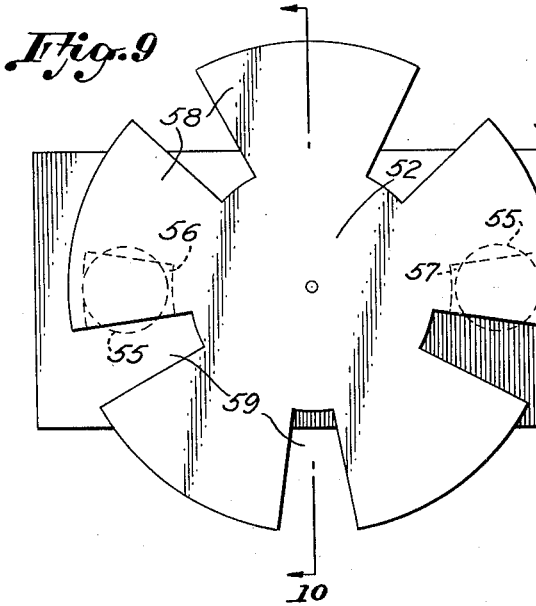
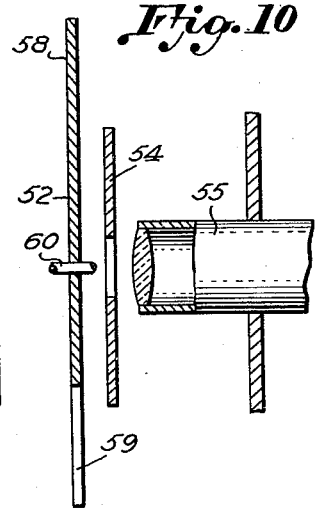
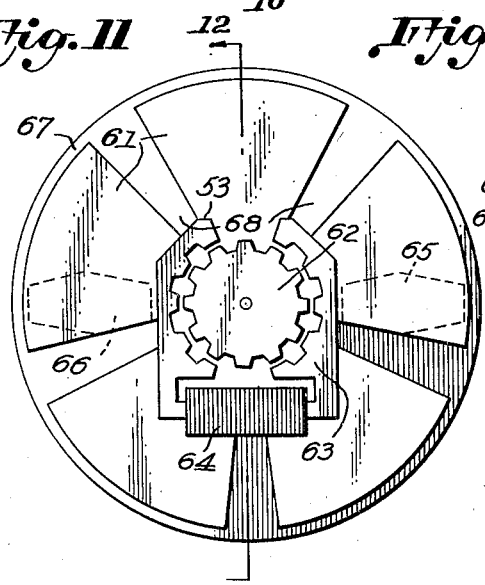
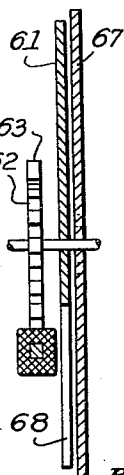
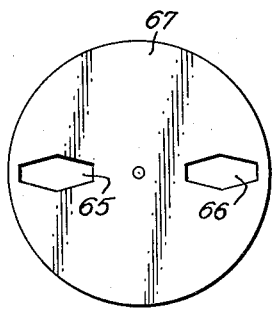
Inventors.
GEORGE D. CALDWELL
GEORGE M. HATHORN
By
Attorney.

Patented Feb. 17, 1942

2,273,512

UNITED STATES PATENT OFFICE 2,273,512

VIEWING INSTRUMENT FOR STEREO-SCOPIC PICTURES AND THE LIKE

Geoffrey D. Caldwell and George M. Hathorn, Claude, Tex.

Application March 16, 1938, Serial No. 196,144

2 Claims. (Cl. 88—16.6)

One object of our invention is to provide means for viewing a projected stereoscopic picture (either a still picture or a motion picture).

Another object is to provide a device for viewing which loses materially less light than many other means adaptable to viewing stereoscopic pictures and particularly natural color stereoscopic picture viewing.

Still another object of this invention is to provide a means for synchronizing the viewing mechanism with a projection mechanism, so that the projection of the picture is synchronized with the eye of the person viewing the picture. This is accomplished in one way by completely eliminating the image, projected from one frame of the film, from one eye, and at the same time making the image projected from another frame of the film simultaneously, visible to the other eye, then immediately reversing the process.

Another object is to provide a means for placing the shutters of a viewing device in substantially relative position with a shutter of a projection means, and for maintaining them in substantial synchronization.

Another object of our invention is to provide a viewing instrument that is simple and easily made; that is adaptable to home use or theater or commercial use. It is an object to provide a relatively silent instrument safe and convenient to use by the ordinary person.

It is an object to provide a construction that is essentially simple to one versed in the art, that is easy to operate, and is inexpensive and subject to production by ordinary machinery now in existence.

While we have herein shown and described certain objects and purposes of the present invention, still it is not our intention to limit ourselves thereto, but we wish it distinctly understood that obvious uses and purposes which will appear from the more technical description hereafter, are to be considered as coming within the scope of our invention.

In the drawings:

Figure 1 shows a plan view of a projector arrangement;

Figure 2 is a perspective view of a preferred form of shutter for use in the projector and the viewing instrument;

Figure 3 is a side elevation of the viewing instrument, view being a sectional view, partially fragmentary;

Figure 4 is a perspective of one embodiment of the viewing instrument;

Figure 5 is a plan view of the film spacing mechanism used to place the desired frames of the film in proper linement with the lenses;

Figure 6 is a front elevation of a film showing the schematic arrangement in which the frames for the images of each picture will be used;

Figure 7 is similar to Figure 6, the size of the film being relatively smaller and therefore the spacing of the frames on which simultaneous images are imprinted being a greater number of frames apart;

Figure 8 is a front elevation of a mask for another form of projecting arrangement;

Figure 9 is a front elevation of a disk form of projecting arrangement, the mask of Figure 8, being in place behind the shutter;

Figure 10 is a sectional side elevation of one embodiment of the projecting instrument, mask and shutter, the view being taken on the line 10—10 of Figure 9, looking in the direction of the arrows. Only a fragment of projector is shown;

Figure 11 is a front elevation of a viewing instrument, the mask being shown behind the shutter and the motor being shown in front of the shutter;

Figure 12 is a sectional side elevation of one embodiment of the viewing mask of Figure 11, the figure being fragmentary, and taken on the line 12—12 of Figure 11, looking in the direction of the arrows; and Figure 13 is a view of the mask used in the viewing instrument of Figures 11 and 12, showing one arrangement of the viewing holes.

Referring more particularly to the construction shown in the drawings, 20 is a shutter used in the projection instrument of the type shown in Figure 1, and one end of the shutter rotates on the axle 21. The other end of the shutter is supported on and rotated by the shaft 22. This shaft is driven primarily by the mechanism consisting of a single phase electric motor, having the stator 23, and the rotor 24. The shaft 22 may have journaled thereon a fly wheel 25, which fly wheel 25 is not fast to the shaft, but may slip thereon. Between the rotor and the fly wheel is the spring 26. It is to be understood, however, that the fly wheel is not essential but if used other tension means may be employed so long as the fly wheel and the rotor are so adjusted as to cooperate in driving the shutter. If the shutter itself is of correct weight, it may satisfactorily act as a substitute for the fly wheel, and may or may not be attached to the shaft rigidly.

The projector is provided with a plurality of lenses 27 and 28, as shown in Figure 1, and has the spools 29 and 30 carrying the film track. This film track 31 may be in the form of slides with a film base or glass base or the like or other desirable form. The arrangement is called a film track, herein, for the purpose of designation only and not for the purpose of limiting it to a projection from a film containing a series of pictures.

The details of the preferred construction and framework of the projector are not shown to any particular degree since they are merely a matter of design. For the purpose of this application, however, the condensing lenses 32 are provided. The light from the bulbs or other light source 33, and as reflected from the reflectors 34, will pass through these lenses 32 on the way to the film track 31 and there through into the projecting lenses 27 and 28.

Referring to Figure 2, this represents one embodiment of a preferred form of shutter arranged for use in both the projector and viewing instrument. It consists of a light material such as aluminum, Celluloid, Bakelite or other suitable material in cylindrical, or other suitable form. It is provided with the apertures 35, 36, 37 and 38. These apertures are of importance in that they must be carefully positioned and sized to accomplish the purpose intended. The apertures 35 and 36 are directly opposite each other on the shell of the cylinder, and the apertures 37 and 38 are also directly opposite each other on the shell of the cylinder, but the apertures 37 and 38 are so positioned as to present together a vertical opening through the cylinder at the same instant the apertures 35 and 36 present a horizontal opening through the cylinder. The arrangements of these openings are such that the passage of an image through the shutter by means of the opening formed by apertures 35 and 36 from a selected plane, will be stopped by rotation of the shutter before an image from the same plane passes through the opening in the shutter formed by the apertures 37 and 38.

The shutter above described in Figure 2 is identical in both the projecting machine and viewing instrument except the size may be varied to suit the needs of the user. In this connection other arrangements of the apertures are possible so long as they are relatively spaced so as to cut off an image from one opening substantially entirely before admitting an image to the opening next to register, the images, of course, being on the same plane. This is very clearly evident from an examination of the arrangement shown in Figures 3 and 4 and compared with the shutter shown in Figures 1 and 2. The number 39 and the number 40 represent eye holes through the viewing instrument, which eye holes are for the purpose of viewing the image as it has been projected by a device such as shown in Figure 1, the user looking through these openings 39 and 40 much as a person would look through a pair of field glasses or the like. The other side of the viewing instrument, not shown, has these openings 39 and 40 corresponding to these indicated in Figure 4.

These eye holes are shown by dotted lines in Figure 3, and the position of the shutter shown in Figure 3 is that where both openings through the shutter are closed to the passage of light for a fraction of a second by the rapidly rotating walls of the cylinder and consequently the eye holes are temporarily entirely blocked for the purpose of permitting the passage of an image to the eyes of a person viewing the projection.

The viewing instrument shutter is supported and driven in a similar manner to the projection device shutter except for the method of fastening the motor to the end plate, as hereinafter explained. The numbers of the parts of the viewing instrument, therefore correspond with those of the projection device where the parts are similar. The bearings 41 and 42 are shown in the viewing instrument of Figure 3, but the supports for the bearings are not shown for the reason that it is not desired to complicate the drawings. It may be well to mention, however, that both of these bearings may be fixed to the motor itself, and the purpose for this will be shown later. It is possible, however, that the bearings may be attached elsewhere. The housing or structure 43 protects the shutter and motor of the viewer, and has a moveable end plate 44 to which the motor assembly is preferably affixed so that the shaft 22 passes through the end plate at substantially the center point thereof. The purpose of fastening this motor on the end plate is to enable it to be turned or rotated with respect to the remainder of the structure 43. This enables the user to turn the motor and shutter within the structure to bring openings in the shutter in the viewing instrument into a relative position with the openings in the shutter of the projector, while both shutters are rotating at the same speed.

In this connection the speed of the shutters is easily synchronized by single phase motors of this type having the same speed. The ordinary alternating current in use today is timed to a certain number of alternations per second, and connecting the two motors to the same current will automatically keep them synchronized and thus keep the shutters likewise synchronized.

The viewing instrument is provided as mentioned above with the end plate 44. This end plate is rotatable with respect to the remainder of the structure 43. Other means, such as a worm-gear arrangement would be feasible for rotating the motor, but the method shown here is very convenient and will accomplish the purpose. It should not be considered as limiting the applicant in the method of adjusting the shutter of the viewing device with respect to the shutter of the projector.

The viewing device, as shown in Figure 4, has the handle or support 45 which may be in the form of a flexible shaft or a hand grip or other supporting means. A jack such as 46 is provided, if desired, so that another viewing instrument may be plugged into the instrument shown. Said other viewing instrument may also have a connection of a similar nature provided so that any number of instruments may in this manner be connected into the circuit, which eliminates the need for extension cord if a number of persons wish to view the projection at the same time. As can be seen this is a very desirable arrangement for audiences of several people. The cord carrying the ordinary jack plug 47 is provided for conducting the current to the viewing instrument.

Referring to Figure 5, we have shown one method for pulling the film through the projector, which method may be (and preferably should be) also provided in the camera with which the pictures are taken. The film track 31 is engaged by a sprocket wheel 48 of such design that lugs or points on the sprocket wheel will engage the perforations along the edge of the film track. These perforations are at the present time in almost any standard camera film particularly the moving picture type. This sprocket wheel engages a ratchet 49 by any convenient gear means. This ratchet 49 has the notches 50 which engage a pawl 51 and thus stop the movement of the ratchet and sprocket and film at the proper place. The spool 29 (spool number 38 not being shown in the detail of Figure 5) has some driving mechanism, not shown here, which may be any conventional type, for maintaining tension on the film track 31. This tension moves the film track 31 when the pawl 51 is out of engagement with the ratchet.

In Figures 6 and 7, an arrangement of film ideally suited for the projection of still pictures is shown. The circles indicate the lenses 27 and 28 and show the relative position of the two frames for each projection. For the purpose of clarifying the action, and arrangement of this apparatus and the film, we here refer to the views as being right and left views. As shown in Figure 6 the images from the second pair of views on the film track are behind the lenses. The left view is designated by 2L and would correspond ordinarily by the image projected through lens 27 and viewed through eye hole 39 by the left eye of the viewer. 2R shows the corresponding frame that would be projected through lens 28 and viewed through the eye hole 40 of the viewing instrument by the right eye of the person viewing the projection, the two images together forming the complete stereoscopic picture.

In this connection, frames on the film track are preferably about the normal distance between the eyes of a person apart, and may vary in distance apart over a small range. The eye holes of the viewing instrument are, of course, the proper position to accommodate the eyes of the person viewing the projection. A convenient distance for the frames, the film track would be separated for each stereoscopic picture, is two and one-half inches. This is a very desirable although not an essential distance for the projection lens (center to center), and the eye holes of the viewing instrument, to be used.

Figures 8, 9, 10, 11, 12, and 13 show another very feasible schematic arrangement for accomplishing the purposes of this invention. In these figures the use is made of a rotating disk-type shutter 52 on the projection instrument which takes the place of and works much on the same theory as the rotating shutter 20 of Figure 1. The viewing instrument uses a rotating disk-type shutter 53 which corresponds in purpose and theory to the shutter of the viewing instrument shown in Figures 2, 3 and 4.

The mask or structure 54 is provided, as shown in Figures 8, 9 and 10, which limits the size of the openings through which the image is projected from the lenses 55. These lenses, of course, correspond with the lenses 27 and 28 of Figure 1. The shutter 52 has one or more plates 58, which may be any number from one to as high as is feasible. These plates 58 are so constructed that the width is greater than the openings 59 by substantially twice or more times the width of the projecting holes 56 and 57 of the viewing mask.

In event a one-plate disk is used, the same relation is maintained between the width of the plate and the width of the opening so that the passing of the image through one lens 55 will be completely blocked before any of the image is permitted to pass through the other lens 55 by the rotation of the disk. The disk may be mounted in any convenient manner in relation to the mask 54, and we have shown the shaft 60, which ordinarily would be centered between the lenses 55 of the projector, and the eye holes 65 and 66. The mask shown in Figure 8 can conceivably be eliminated by proper sizing of the openings in the projection lens 55. If the width of the plate 58 is greater than the opening 59 between the plate or plates by an amount equal to or greater than double the diameter of the projection lenses the mask 54 may be dispensed with.

In the viewing instrument shown in Figures 11, 12 and 13, 53 as above stated designates the disk-type shutter which corresponds to the shutter of the viewing instrument in Figure 4. This shutter 53 has the plates 61 preferably corresponding to the plates of the projecting instrument in number. We have shown this disk as being provided with driving mechanism consisting of a single phase electric motor having the rotor 62, the stator 63 and the coil 64. This motor may be mounted in relation to the mask in any convenient manner.

The plates 61 of the viewing instrument are greater in width than the openings 68 by an amount at least equal to or greater than the openings 65 and 66 combined, of the viewing mask 67, as shown in Figure 13. The openings 65 and 66 are of a convenient form and conveniently spaced to accommodate the eye of the viewer.

It is ordinarily necessary to spin the motor driving the shutters for the viewing instrument and the projection instrument (it being understood, of course, that the motors driving the shutters 52 and 53 must also be started, although not shown here), in the type of motor shown here. In connection with Figures 1, 3 and 4, we have provided a knurled knob 69 by which the shaft, rotor, fly wheel, shutter, and other attached mechanism, if any, may be spun by hand to start the motors.

We have not shown the current source, nor the complete arrangement of means for projector and sustaining the mask and viewing means in position for the reason that any ordinary convenient means may be used. For like reasons, in none of the figures have we shown a scheme which would ordinarily be used as the reflecting medium for the image after it is projected so that it will reach the eye of the viewer.

The theory for the disk-type shutter and cylindrical shutter arrangements shown here is the same, and the device for working out this theory may be varied within ordinary limits. The shutter does not have to be cylindrical, but may be square or other shape. However, the essential point to be kept in mind is that the means for projecting one picture must be correlated in timing with the one eye hole on the corresponding viewing means, so that for example the left-hand image is projected and admitted to the eye hole for the left eye of the person viewing the projection. As the projection means is alternated to project the image from the right-hand lens of the projector, and the viewing means is alternated to admit the image to the right eye of the person viewing, each image must be substantially completely blocked from the proper eye before the other image is admitted in any part through the openings on to the screen and through the viewing instrument and to the right eye of the person viewing the projection.

In actual practice the projectors will have the alternating means so arranged that the images of the two frames forming a complete stereoscopic picture will be alternately projected on the screen in rapid succession, and the viewing mechanism will be so timed that the left eye will see only the projection from the left-hand lens and the right eye will see only the projection from the right-hand lens.

It is understood that this device is equally adaptable to moving pictures but that the film track arrangement would ordinarily not be the same as that shown in Figures 6 and 7. In the case of motion pictures it is very desirable that the change of frames behind each projection lens be accomplished during the instant the projection lens for that frame is closed.

In the event the shutters of the projector and viewing devices were started while out of relative position, it becomes necessary to bring them into relative position so that projection through the left opening of the shutter of the projector is viewed at the same instant by the left eye of the person viewing, through the left opening of the viewing instrument. If it is necessary to make this adjustment, the motor driving the shutter, and the shaft driving the shutter, are moved through the arc necessary to effect proper timing. This movement is done while both shutters are rotating.

While we describe positions on the shutters as "right" and "left," in some instances it is feasible to position the shutter (particularly in the projector) in the vertical, and in such instances we do not intend to limit ourselves by the terms "right" and "left," but will be understood as meaning "upper" and "lower."

The form of the invention herein shown and described presents a preferred embodiment thereof, and delineates its adaptation to practical use, but it is to be understood that the present disclosure is to be considered from the illustrative standpoint and not as imposing restriction or limitation on the invention.

While we have herein shown and described certain features of our invention, still we do not wish to limit ourselves thereto, except as we may do so in the claims.

We claim:

1. A viewing instrument for stereoscopic pictures and the like comprising a shutter housing with eye holes therein, a motor housing rotatably journaled with respect to said shutter housing, a single phase synchronous electric motor secured in said motor housing, shutter means adapted to alternately open and close the eye holes, said shutter means being journaled on the motor shaft whereby rotation of the motor housing rotates the shutter means regardless of whether the shutter is operating.

2. A viewing instrument for stereoscopic pictures comprising a shutter housing with eyeholes therein, a substantially cylindrical shutter within said housing and co-axially journaled on shaft means to rotate therein, viewing apertures substantially diametrically through the shutter and in opposite diametrical planes, each shutter viewing aperture being positioned longitudinally of the shutter whereby, upon rotation of the shutter, each viewing aperture alternates with the other in substantially aligning the respective viewing apertures in the cylindrical shutter and the eyeholes in the shutter housing twice for each rotation of the shutter at each eyehole, thus enabling each viewing aperture to be seen through twice per each rotation for each eye of a viewer, the arrangement being such that at least one of said viewing apertures through the shutter is closed to the vision of a viewer at all times when the other viewing aperture is open, a cap closing one end of said shutter housing, said cap having a synchronous single phase electric motor attached thereto and said electric motor drive shaft supporting one end of the shutter, the other end of said drive shaft extending through the housing means and rotatable to start the motor and shutter, the motor on the cap comprising the bearing means for the shutter shaft means.

GEOFFREY D. CALDWELL.
GEORGE M. HATHORN.